United States Patent
Gila et al.

(10) Patent No.: US 7,630,918 B2
(45) Date of Patent: Dec. 8, 2009

(54) DUAL TOLL SYSTEM

(75) Inventors: Janos Gila, Mödling (AT); Wolfgang Konrad, Mödling (AT)

(73) Assignee: Siemens Aktiengesellschaft, Munich (DE)

( * ) Notice: Subject to any disclaimer, the term of this patent is extended or adjusted under 35 U.S.C. 154(b) by 757 days.

(21) Appl. No.: 10/480,421

(22) PCT Filed: Jun. 12, 2002

(86) PCT No.: PCT/DE02/02158

§ 371 (c)(1),
(2), (4) Date: Dec. 12, 2003

(87) PCT Pub. No.: WO02/101665

PCT Pub. Date: Dec. 19, 2002

(65) Prior Publication Data

US 2004/0153401 A1    Aug. 5, 2004

(30) Foreign Application Priority Data

Jun. 12, 2001    (AT) .............................. A 913/2001

(51) Int. Cl.
*G06Q 99/00* (2006.01)
(52) U.S. Cl. .............................. 705/13; 705/1; 705/417
(58) Field of Classification Search .................. 705/13, 705/417, 1
See application file for complete search history.

(56) References Cited

U.S. PATENT DOCUMENTS

| | | | |
|---|---|---|---|
| 5,717,389 A | 2/1998 | Mertens et al. | |
| 5,721,678 A * | 2/1998 | Widl | 705/417 |
| 5,864,831 A | 1/1999 | Schuessler | |
| 5,933,114 A | 8/1999 | Eizenhoefer | |
| 5,970,481 A * | 10/1999 | Westerlage et al. | 705/417 |
| 6,028,626 A * | 2/2000 | Aviv | 348/152 |
| 2002/0045975 A1* | 4/2002 | Carr et al. | 701/19 |

FOREIGN PATENT DOCUMENTS

| | | |
|---|---|---|
| CA | 2 335 182 | 12/1999 |
| CA | 2 340 137 | 2/2000 |
| CA | 2 390 352 | 4/2001 |
| CA | 2 437 303 | 8/2002 |
| CA | 2 450 404 | 12/2002 |
| CA | 2 498 858 | 3/2004 |
| CA | 2 499 262 | 3/2004 |
| DE | 4310099 | 9/1994 |
| EP | 1006340 | 6/2000 |
| HU | 220 572 B1 | 3/2002 |
| HU | 221 829 B1 | 1/2003 |
| KR | 2001/39 159 | 5/2001 |
| WO | WO 0120538 A2 * | 3/2001 |

* cited by examiner

*Primary Examiner*—Akiba K Robinson Boyce
(74) *Attorney, Agent, or Firm*—Harness, Dickey & Pierce, P.L.C.

(57) ABSTRACT

A charging device (BEV) on an vehicle (FAR), for a dual toll system (SYS), is capable of receiving positional data from a position determining system (PES), concerning the actual location of the vehicle (FAR) and to calculate location co-ordinates (OKO) for the vehicle (FAR). Said charging device (BEV) is further capable of calculating a characteristic signature (SIG) for the stretch of road (STR) traveled by the vehicle (FAR) by means of location co-ordinates (OKO) for the vehicle (FAR) and transmitting the same to an accounting centre (ABZ), outside the vehicle.

3 Claims, 6 Drawing Sheets

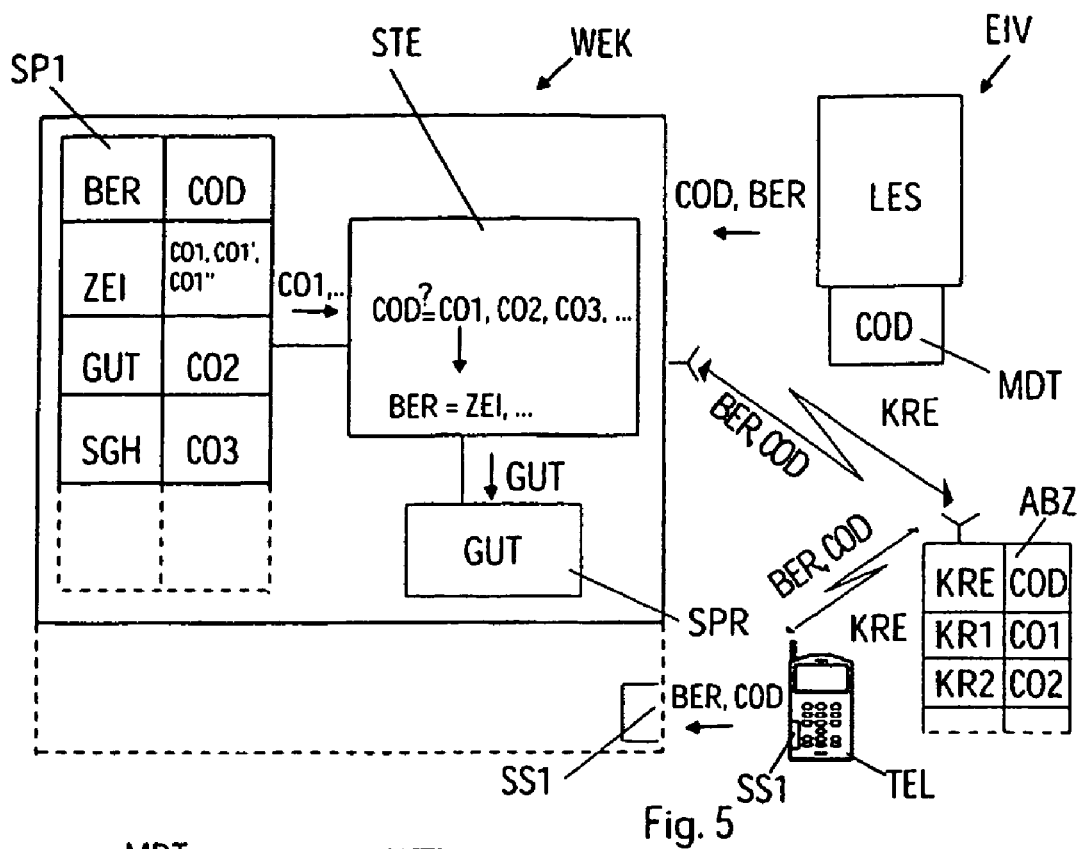
Fig. 5
Fig. 6
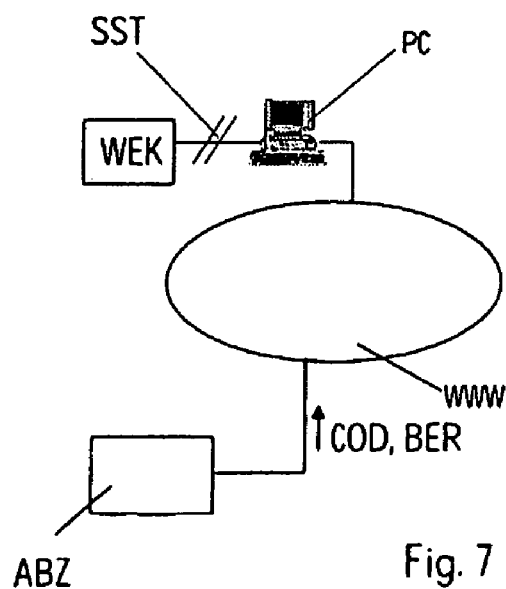
Fig. 7

DUAL TOLL SYSTEM

This application is the national phase under 35 U.S.C. § 371 of PCT International Application No. PCT/DE02/02158 which has an International filing date of Jun. 12, 2002, which designated the United States of America and which claims priority on Austrian Patent Application number AT 913/2001 filed Jun. 12, 2001, the entire contents of which are hereby incorporated herein by reference.

FIELD OF THE INVENTION

The invention generally relates to a toll system. Preferably, it relates to one having a position finding system for finding the position of a vehicle by way of a vehicle toll payment apparatus which has a receiving unit. The receiving unit may be designed to receive position data from the position finding system and transmit this position data to a controller for the toll payment apparatus. The toll payment apparatus may be designed to use the position data to determine current position coordinates for the vehicle. Further, the toll payment apparatus may include a transmitting unit designed to transmit data to a billing center which is external to the vehicle and a receiving unit designed to receive data from the toll payment apparatus and pass it to a controller in the billing center.

The invention also generally relates to a vehicle toll payment apparatus for a toll system. The apparatus preferably includes a receiving unit designed to receive position data from a position finding system and designed to transmit this position data to a controller. The controller may be designed to use the position data to determine current position coordinates for the vehicle. In addition, the toll payment apparatus may include a transmitting unit which is designed to transmit data to the billing center.

The invention also generally relates to a vehicle-external billing center for a toll system. Preferably, the billing center includes a position finding system for finding the position of a vehicle and a vehicle toll payment apparatus. The billing center may include a receiving unit which is designed to receive data from the toll payment apparatus.

BACKGROUND OF THE INVENTION

DE 43 44 433 A1 has disclosed a toll payment apparatus and a toll system, in which current position coordinates are recorded by a GPS receiver in the vehicle toll payment apparatus. They are further permanently compared with the entry/exit coordinates of a turnpike section which are stored internally in an electronic vignette. If the coordinates match, they are transmitted by way of a digital mobile network to a vehicle-external billing center. The transmitted data are then used in the billing center to calculate the turnpike kilometers traveled, and the turnpike charges associated with them.

WO 95/20801 discloses a toll payment apparatus for fixing toll fees, with the currently determined position of the vehicle being compared with a large number of positions of virtual payment points.

The known toll payment apparatuses have the primary disadvantage that it is impossible to carry out any toll payments if the communication with the position measurement system fails at times. A further disadvantage is that the amount of data in toll systems which use the known toll payment apparatuses is very large owing to the permanent comparison of the current position coordinates with the coordinates of the virtual toll payment points.

SUMMARY OF THE INVENTION

One object of an embodiment of the invention is to provide a toll system which can be implemented easily and at low cost, and by which correct toll payments can be made, even if the communication with a position finding system fails at times.

According to an embodiment of the invention, an object may be achieved by a toll system in that the controller for the toll payment apparatus and/or the controller in the billing center are designed to use the position coordinates to calculate a signature which is characteristic of a route traveled. The controller in the billing center may be designed to use the signature to determine whether the route is subject to a toll fee. The controller furthermore may be designed, for the situation where the route traveled is subject to a toll fee, to use a user authorization which is stored in a memory to check whether the vehicle is authorized to use this route.

By calculating a signature which is uniquely characteristic of a route traveled, an embodiment of the invention makes it possible to considerably reduce the amount of data in the toll system. This can occur, since, in contrast to the known methods and systems, it is possible to determine in the form of a yes/no decision whether or not a route which is subject to toll fees has been traveled on. Thus, it is not necessary to transmit position data permanently in order to determine the toll fees.

A toll payment apparatus which is particularly suitable for implementation of the system according to an embodiment of the invention is one in which the controller for the toll payment apparatus is designed to use the position coordinates to calculate a signature which is characteristic of a route traveled, and to transmit this to the transmitting unit.

One advantageous embodiment of the invention provides for the controller for the toll payment apparatus to be designed to calculate the signature at time intervals which can be predetermined.

In one preferred embodiment of the invention, the position finding system is a satellite navigation system.

Further advantages can be achieved by the vehicle toll payment apparatus, in an embodiment, being designed to transmit the signature to the billing center via a radio network.

Furthermore, the vehicle toll payment apparatus, in an embodiment, can be designed to receive position correction data via the radio network in order to determine the position coordinates.

A billing center may also be particularly suitable for implementation of the system according to an embodiment of the invention, which has a controller which is designed to use a signature which is characteristic of a route over which the vehicle has traveled to determine whether the route is subject to a toll fee. The controller also may be designed, for the situation where the route traveled is subject to a toll fee, to use a user authorization. The authorization may be stored in a memory, to check whether the vehicle is authorized to use this route.

The receiving unit in the billing center may be advantageously designed to receive position coordinates for the vehicle from the toll payment apparatus and to pass them to the controller. The controller may be designed to use the position coordinates to calculate the signature which is characteristic of the route that the vehicle has traveled.

In one preferred embodiment of the invention, the usage authorization is an account which is associated with the vehicle, and the controller is designed to debit any toll fee that is incurred from the account.

BRIEF DESCRIPTION OF THE DRAWINGS

The present invention will become more fully understood from the detailed description of preferred embodiments given hereinbelow and the accompanying drawings, which are given by way of illustration only and thus are not limitative of the present invention, and wherein:

FIG. 5 shows a variant of the prepayment card from FIG. 1a in more detail, and a reader for crediting a user authorization on the prepayment card;

FIG. 6 shows a mobile data storage medium with a code for crediting a user authorization to the prepayment card, FIG. 7 shows the prepayment card from FIG. 5, which is connected to a data network for the purpose of charging a usage authorization.

DETAILED DESCRIPTION OF THE PREFERRED EMBODIMENTS

Figure 1:
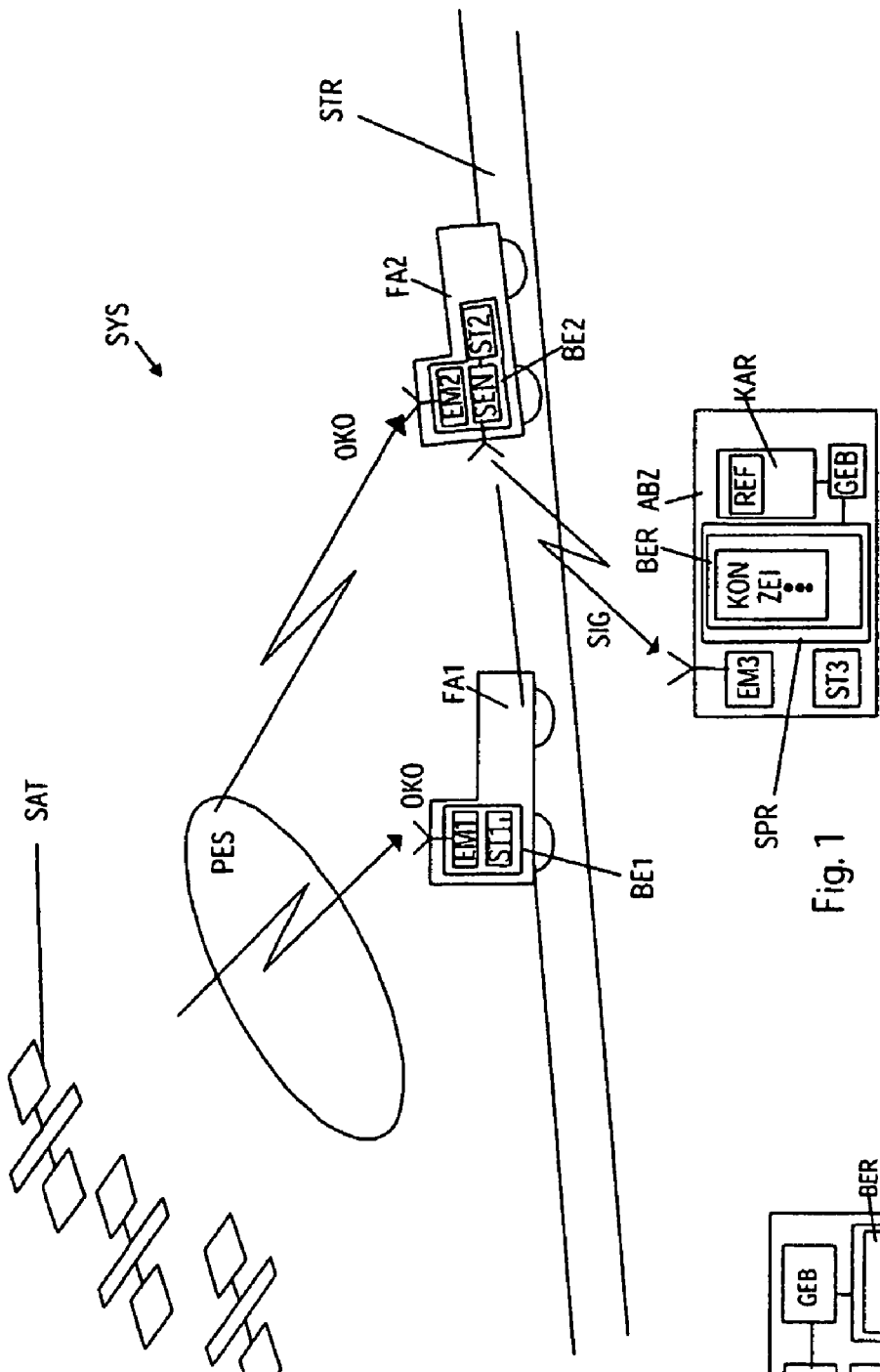
FIG. 1 shows a dual toll system having a toll payment apparatus according to an embodiment of the invention.

As is shown in FIG. 1, a toll system SYS, preferably a dual toll system, has a position finding system PES for locating a vehicle FAR, for example the known "Global Positioning System", or GPS system for short.

In this document, as already mentioned above, the expression a dual toll system includes a toll system which not only allows payment of the toll fees without any communication with a billing center ABZ external to the vehicle, directly in a toll payment apparatus BE1, which is designed specifically for this purpose, in the vehicle FAR, and payment of the toll fees via a billing center ABZ, which, in the second case, the vehicle includes a toll payment apparatus BE2 which is designed for communication with the billing center ABZ.

In order to determine their current position coordinates OKO, the vehicles FA1, FA2 each have a toll payment apparatus BE1, BE2 with in each case one receiving unit EMP. The receiving unit is designed to receive position data by way of the position finding system PES, preferably a satellite navigation system. A controller ST1, ST2 for the respective toll payment apparatus BE1, BE2, uses the position data to calculate the current position coordinates.

If the position finding system PES is the GPS toll system, then the toll payment apparatuses BE1, BE2 may each have a GPS module in order to determine the position data or find the position coordinates. Route determination and position finding using a GPS are described, for example in "Umgebungserfassung auf Basis lernender digitaler Karten zur vorausschauenden Konditionierung von Fahrerassistenzsystemen" [Environment recording on the basis of learning digital cards for predictive conditioning of driver assistance systems]; Michael Schraut; Dissertation to the Faculty of Electrical Engineering and Information Technology at the Munich Technical University, the entire contents of which are hereby incorporated herein by reference.

The position coordinates OKO as determined by the toll payment apparatus BE1 according to an embodiment of the invention are used in the manner described in the following text to determine whether the route STR traveled is subject to a toll fee.

Figure 2:
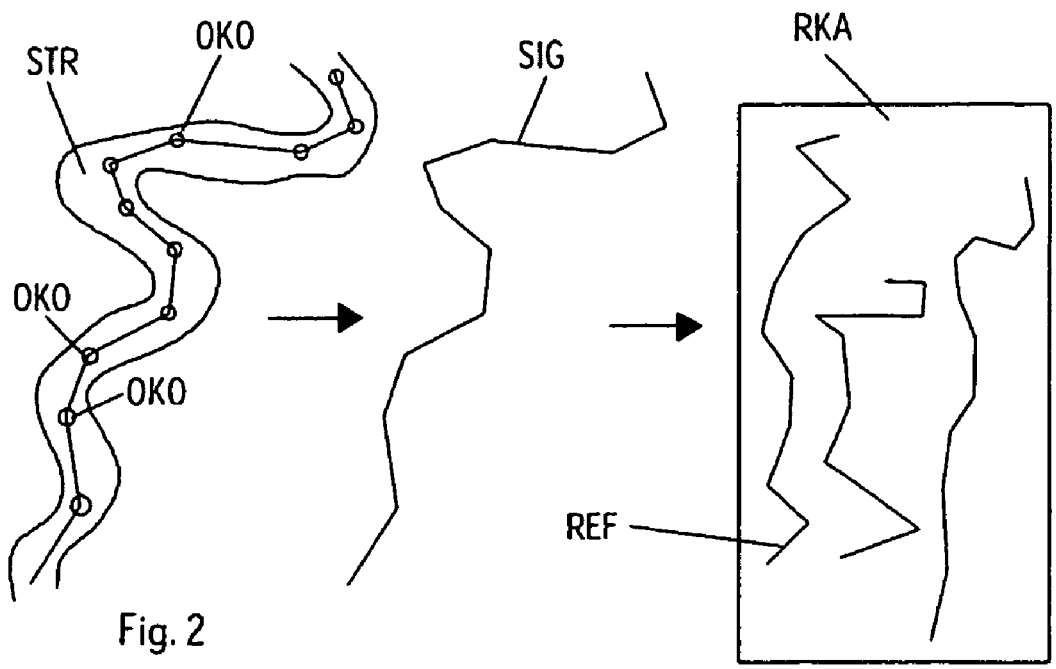
FIG. 2 shows a schematic procedure for determining whether a route traveled is subject to a toll fee.

As is shown in FIG. 2, a characteristic signature SIG, for example in the form of polygon trains on which the determined position coordinates OKO are located is calculated at intervals, which can be predetermined, for the respective route STR that has been traveled. This can be done from the position coordinates OKO that have been obtained, in the controllers ST1, ST2 for the vehicle toll payment apparatuses BE1, BE2.

This characteristic signature SIG is used to determine whether this route is subject to a toll fee. This is done by comparing it for similarity or for a match with routes on a reference map RKA or reference signatures REF which, for example, are likewise in the form of polygon trains. The intervals in which the signature SIG is calculated can be predetermined by a toll system operator.

The position coordinates OKO which are determined by the toll payment apparatus BE2 according to an embodiment of the invention can be transmitted via a transmitting unit SEN to a receiving unit EM3 in a vehicle-external billing center ABZ. The vehicle-external billing center ABZ may have a controller ST3 which is designed to receive the position coordinates from the receiving unit EM3, to calculate the signature SIG for the route STR traveled, and to determine whether this route STR is subject to a toll fee.

Figure 3:
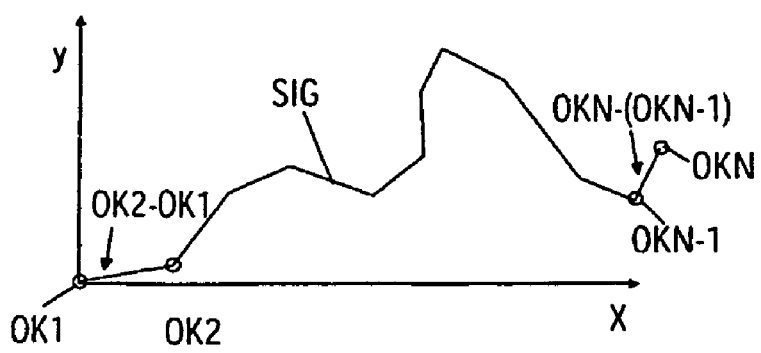
FIG. 3 shows a signature, which is determined on the basis of position coordinates, for a route traveled.

As is shown in FIG. 3, the relative positions of the position coordinates OKO with respect to one another, that is to say the direction vectors which are defined by two successive position coordinates OK1-OKN, may be the forming characteristic for the signature SIG if this is created in the form of a polygon train. The signature SIG may, of course, also be determined using other parameters relating to the route STR, for example the mean height difference or height profile, the mean radius of curvature or the profile of the radius of curvature on the route STR, etc. The signature SIG is characteristic of the route STR traveled and allows a check as to whether this is a route that is subject to a toll fee. In this case, in contrast to the situation with the known toll payment methods, the positions of the determined position coordinates OKO are not determined on a map. Instead, characteristic signatures SIG are calculated for the route traveled from a number of position coordinates.

Figure 4:
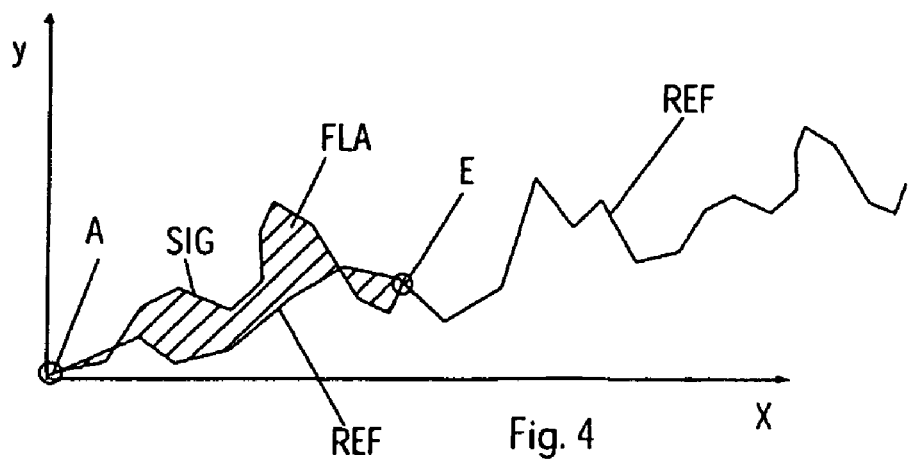
FIG. 4 shows a comparison between the signature from FIG. 3 and a reference signature from a route that is subject to a toll fee.

As is shown in FIG. 4, both the reference signature REF and the signature SIG are in digital form. In this case, the reference signature REF may contain more data values than the signature SIG since, in fact, an overall reference route which is subject to a toll fee may be in the form of a reference signature REF, while the signature SIG can be calculated at time intervals that can be predetermined, for which reason it is possible for the currently calculated signature SIG to correspond to only one section of the entire route traveled.

By way of example, if the signature SIG and the reference signature REF are in the form of polygon trains, the start and end point of the signature SIG may be made to coincide with a respective point in the reference signature REF for comparison of the signature SIG and reference signature REF. This procedure is based on the assumption that the signature SIG is identical or similar to only those sections of the reference signature REF, whose start and end points can be made to coincide with the start and end points of the signature SIG. For this purpose, the signature SIG may be moved along the curve which is predetermined by the reference signature REF.

If a section of the reference signature REF is determined in which the start A and end points E of the signature SIG can be made to coincide with points in the reference signature REF, it is possible to calculate the size of the area FLA which is bounded by the signature SIG and the reference signature REF. If the signature SIG is identical to a section of a reference route which is subject to a toll fee, then the size of the area FLA which is enclosed by the reference signature REF and the signature SIG is close to zero. In order to allow a reliable comparison between the signature SIG and the reference signatures REF despite any measurement errors that occur, a bound may be defined for the magnitude of enclosed area of the signature SIG and the reference signature REF, both for the enclosed area FLA and for the maximum permissible discrepancy. If the magnitude of the enclosed area FLA and the maximum discrepancy are within these bounds, then the signature SIG may be regarded as being identical to the reference signature REF or to the relevant section of the reference signature REF. Further, the route STR traveled may be classified as being subject to a toll fee.

In order to determine whether the route traveled is subject to a toll fee, the signature SIG is compared with all of the reference signatures REF for routes that are subject to toll fees that are known to the toll system. If two or more routes that are subject to toll fees may possibly have been traveled on, then the route which is regarded as the route traveled is that whose reference signature provides the best match with the signature SIG.

The procedure described above represents only one of a large number of options for forming the signature SIG and for comparing the routes that are subject to toll fees with reference signatures REF. Further methods and apparatuses for carrying out a comparison of patterns or objects for similarity or for location purposes are known in large numbers to those skilled in the art.

By way of example, the position coordinates OKO that are obtained may also be regarded as an implementation of a complex random variable, the departure from their trajectory may be regarded in a corresponding manner as a stochastic process, with the normal assumptions relating to ergodicity, etc. This process, which is related to discrete times on the basis of the position measurements that are carried out at discrete times, may, for example, make use of Kalman filtering to make it more robust to measured value failings as a consequence of inadequate reception of position data.

Furthermore, if the position data is erroneous, the process that has just been mentioned can be used as the basis for a mobility model which models the discrepancy, as caused by the position finding process, from the unknown "nominal trajectory" by additive, Gaussian, white noise. The reference process which can be derived on the basis of the reference map KAR is modeled in a similar manner. Further, the inaccuracy in the reference map KAR is in this case also regarded as noise.

These two processes can be processed using methods for spectral analysis or time-domain analysis as are known from digital signal processing. Hypothesis tests can also be used. For example, it is possible to use the eigen value distribution of a covariance matrix of the two processes or a specifically pronounced spectrum to deduce whether the route traveled is the same as the reference route that is subject to a toll fee.

The method which has likewise just been mentioned by way of example may also be regarded as a mapping rule with statistical error treatment, in which the compressed, characteristic properties, the signatures SIG and reference signatures REF, the route traveled and a reference route are compared with one another. The match with a route or reference signature REF that is known to the toll system is in this case checked using characteristic features of the trajectory of the route traveled, the signature SIG, in which each reference route that is known to the toll system or each reference signature REF can be assigned a toll fee that can be predetermined.

One advantage of this systematic procedure, which is based on statistical methods, is also the capability to estimate the remaining error and to take account of any measurement errors in the case of position data or position coordinates OKO that is or are subject to errors. If the current position measurements and map references are not subject to any error, that is to say they are not subject to any noise, then any desired objective map can be used that carries out information compression.

One advantage of the signature calculation process is that there is no need for permanent position finding for the vehicle FAR in order to determine whether it is on a route that is subject to a toll fee. In principle, it would be sufficient to calculate a signature SIG once for a route STR being traveled, for example on the basis of the position coordinates OKO measured in a time period of five minutes, in order to make it possible to determine whether vehicle FAR is on a route that is subject to a toll fee. In order to determine the route STR traveled, there is therefore no need to achieve the accuracy of known position-finding methods. This is because there is no need for exact position finding, but only for a yes/no decision to be made on whether a vehicle is or was on a route that is subject to a toll fee at a specific time or in a specific time period.

As already mentioned above, the toll system operator can predetermine the intervals in which the signature SIG is intelligibly calculated as a function of the desired position-finding accuracy.

The reference routes and the reference map RKA for the dual toll system as shown in FIG. 1 may be stored in a memory of a second type of toll payment apparatus BE2, which is referred to (as will be mentioned in more detail further below) as a prepayment card, or in a billing center ABZ which is external to the vehicle and which is designed to set up a communication link with the toll payment apparatus BE1 according to an embodiment of the invention which, as mentioned further below, is referred to as a calculation unit OBU, in which each of the reference routes or reference signatures REF may be allocated a toll fee GEB which can be predetermined.

In order to determine whether a route STR is subject to a toll fee, a similarity comparison can be carried out between the route traveled and the route which is predetermined by the reference map KAR, within the scope of the dual toll system, either in the toll payment apparatus BE1—the prepayment card—or in the billing center ABZ and, in this case, as already described above, if the decision threshold is exceeded, then the route traveled is regarded as being that reference route REF that is subject to a toll fee which gives the best match.

The comparison of the signature SIG with a reference route or reference signature REF which is known to the toll system SYS makes it possible to uniquely determine not only the route STR that is subject to a toll fee but also the length of the distance DIS which the vehicle FAR actually travels on a route STR that is subject to a toll fee.

If the route STR that has been determined is subject to a toll fee, then a usage authorization BER which is stored in a memory SPR in the toll payment apparatus BE2—the prepayment card (FIG. 1a) or in the billing center ABZ can be used to check whether the vehicle FAR is authorized to use this route STR.

In principle, as already indicated, it is possible to distinguish between two types of toll payment in the dual toll system SYS. One type of toll payment includes the user authorization BER being stored in a memory SPR in the toll payment apparatus BE1. The calculation of the signature SIG and a comparison with the reference signatures REF for the routes which are subject to a toll fee are in this case carried out by the toll payment apparatus BE1 on board the vehicle FAR. In this embodiment, the corresponding toll payment apparatus BE1, which is referred to in the following text as a prepayment card WEK, does not have to set up any communication link with a billing center ABZ external to the vehicle, since it already has all the information which it requires for calculation and billing of the toll fees, or receives it from the position finding system PES.

Figure 1A:
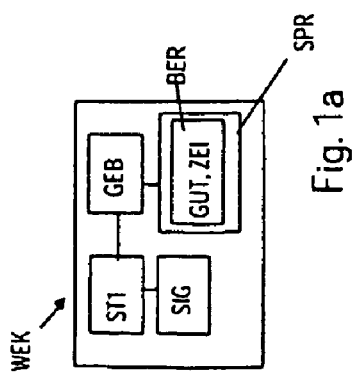
FIG. 1a shows a prepayment card for toll payment for a vehicle.

The usage authorization BER for the prepayment card WEK may, as is shown in FIG. 1a, be in the form of a credit GUT and may be stored in a memory SPR in the prepayment card WEK, with a controller STE being provided which may be designed to debit toll fees GEB that are incurred from the credit GUT. Once the credit GUT has been consumed, then the vehicle FAR may no longer use routes STR that are subject to a toll fee.

However, the usage authorization BER for the prepayment card WEK need not necessarily be in the form of a credit GUT. The usage authorization BER may, for example, also be in the form of a time card ZEI, which is stored in the memory SPR in the prepayment card and authorizes, etc., the routes STR which can be predetermined for use and are subject to a toll fee, within a certain time period.

If the usage authorization BER is in the form in which the number of kilometers, which can be predetermined, which may be traveled on routes STR which are subject to a toll fee, then the number of kilometers which have already been traveled can be debited from a distance credit which is stored in the memory unit SPR in the prepayment card.

The implementation of usage authorizations BER for a limited time in the prepayment card WEK can be implemented, for example, by attaching a time stamp STE to the signature SIG. Both the route which is being used and is subject to a toll fee and the usage time can then be defined uniquely on the basis of the signature SIG and the time stamp STE, and a check as to whether the vehicle FAR may or may not drive at this time on the route STR which is defined by the signature SIG can be carried out on the basis of the time stamp STE. This ensures that the toll fee GEB will be paid correctly despite the lack of communication with a toll control point.

The nature of the usage authorization BER (credit, time card, distance credit, time link etc.) which is desired by a vehicle occupant and/or is predetermined by the toll operator may, for example, be transferred or activated in the prepayment card WEK by means of a code COD. Any type of usage authorization BER may in this case be assigned a code CO1, CO2, CO3, which can be predetermined, in the prepayment card (FIG. 5).

For example, it is thus possible to allocate a first code CO1 to a time card ZEI for all routes STR which are subject to a toll fee in a region which can be predetermined, while a different code CO2 charges a credit GUT, the amount of which can be predetermined, or a third code CO3 increases the route credit SGH by an amount which can be predetermined.

Different types of usage authorizations BER may, of course, also be stored in the prepayment card at the same time, and may be activated as required. If, for example, the usage authorization BER for one route is in the form of a time card ZEI which authorizes the route STR which is subject to a toll fee to be used in a specific time period, a credit GUT can also be provided in parallel with this. If the vehicle FAR is using the route STR for which a valid time card ZEI exists, then the driver can deactivate the debiting from the credit GUT and can "use" the time card ZEI electronically. This use of the time card ZEI corresponds essentially to a change to the billing mode in the prepayment card, and can be carried out by operating an input unit on the prepayment card, for example a button.

After receiving the code COD, the controller STE for the prepayment card WEK can identify and enable or activate the corresponding usage authorization DER by comparison of the code COD that has been produced by the user with the codes CO1, CO2, CO3 which are stored in the memory unit SP1.

If a time card ZEI for a specific route and a credit GUT are activated in the prepayment card WEK, then the driver can deactivate the debiting from the credit GUT and can "use" the time card ZEI electronically as soon as he is driving on the route for which the time card exists.

This use of the time card ZEI corresponds essentially to a change to the billing mode in the prepayment card WEK, and can be carried out by operating an input unit on the prepayment card, for example a button. In principle, any combination of user authorization BER is feasible.

A user authorization BER in the form of a credit GUT may be allocated to two or more codes CO1, CO1', CO1" which correspond to different amounts of money. After payment of the appropriate amount, the code CO1, CO1', CO1" which corresponds to this amount can be entered in the prepayment card, and the credit GUT can be increased by this amount.

Analogously to what has just been stated, the other forms of the usage authorization BER can also be obtained for the prepayment card WEK. That is to say the "enable code" for this form of usage authorization BER is obtained against payment of the amount associated with usage authorization BER to the toll operator by the vehicle user, and is transferred to the prepayment card WEK.

The code COD may be transmitted to the prepayment card WEK, for example, by way of an input apparatus EIV which is connected to the prepayment card WEK with or without the use of lines. Examples of a connection based on lines between the input apparatus EIV and the prepayment card WEK would include copper wire, glass fibers, etc. Examples of a connection without the use of lines include radio, infrared transmission, lasers, etc.

In order to prevent a usage authorization BER from being criminally loaded into the calculation unit BEE, the code CO1, CO2, CO3 may be encrypted and may be transmitted to the prepayment card WEK in a form which cannot be identified by the user.

The code COD may be stored in a mobile data storage medium, for example a magnetic card. In this case, the input apparatus EIV for transmission of the user authorization BER or of the code COD to the prepayment card WEK may be in the form of a reader LES for mobile data storage media. In order to prevent criminal reuse of the mobile data storage medium, the reader LES may be designed to end the transmission process of the code COD to the prepayment card WEK when the mobile data storage medium is cancelled. This cancellation may, for example, comprise the information contained in the mobile data storage medium being deleted by the reader, or by a value WER which indicates the validity of the card being changed from "valid" to "invalid" (FIG. 6).

Another possible way to transmit the code COD to the prepayment card WEK is for it to be entered manually into the calculation unit BEE, after payment of the amount associated with it, by a person who is authorized by the toll operator, via an input apparatus for the calculation unit BEE, for example a keypad or a touchscreen.

Furthermore, the code COD may also be transmitted via a radio network, preferably the GSM network, to the prepayment card. For this purpose, the prepayment card may have a radio module, for example a GSM module, or may be connected to a module such as this, via which a connection to the billing center ABZ of the toll point operator can be produced on request, for example by activation of a key which can be predetermined, or a key combination on a keypad on the prepayment card. Once the connection has been set up, the vehicle user can select the desired user authorization BEE, for example assisted by an audible menu, as is normal, for example, for prepayment cards for mobile radios. The payment for the usage authorization BER or for the code COD may be made, for example, by means of a credit card or by means of a withdrawal authority in favor of the toll operator on an account of the vehicle user.

After selection of the desired usage authorization BER and payment for it, the code COD can be transmitted from the billing center ABZ to the prepayment card.

As is known from GSM prepayment card mobile radio telephones, the payment for the usage authorization BER may be made by obtaining a toll prepayment card on which at least one credit code KRE, KR1, KR2, which is associated with the respective type of user authorization BER, is printed. After setting up a connection to the billing center ABZ via the GSM network, this credit code KRE, KR1, KR2 can be transferred from the prepayment card to the billing center ABZ after being inserted into the calculation unit BEE, for example via a keypad on the prepayment card. After obtaining the credit code KRE, the billing center ABZ transmits the user authorization BER that is associated with this credit code KRE, KR1, KR2, for example in the form of a code COD, as already described above.

The setting up of a connection for transmission of the credit code KRE, KR1, KR2 and of the user authorization BER may also take place between the input apparatus EIV and the billing center ABZ. The input apparatus EIV may, for example, be a mobile radio telephone TEL, by which the credit code KRE, KR1, KR2 is transmitted to the billing center ABZ, with the corresponding user authorization BER being transmitted to the mobile radio telephone in the form of the code COD once the credit code KRE, KR1, KR2 has been received from the billing center ABZ. The user authorization BER can then be transmitted on request from the mobile radio telephone TEL to the prepayment card via an interface SS1, for example an infrared interface.

As is shown in FIG. 7, the usage authorization BER or the code CO1, CO2, CO3 may also be transmitted to the prepayment card via a computer PC which is connected to a data network WWW, preferably to the Internet. In this case, the code C01, CO2, CO3 may be transmitted on request from a billing center ABZ of a toll point operator via the Internet to the computer PC, which is designed to transmit the code C01, CO2, CO3 to the prepayment card, for example via a USB interface. When the code COD is transmitted via a radio network, the usage authorization BER may be paid for by use of a credit card, etc.

In order to make it possible to carry out a position-dependent debit from the credit GUT despite the lack of any communication between the prepayment card WEK and a toll control point, the currently determined GPS position may be compared with a map of virtual toll points stored in a memory in the prepayment card WEK. Further, the toll fee incurred so far as determined by the GPS measurement can be debited from the credit GUT when driving through the virtual toll points. However, in situations such as this, it is also advantageous to calculate a route signature.

In some situations, the accuracy of the detection of the current position coordinates OKO on the vehicle FAR by way of the GPS toll system may not be sufficient when using the prepayment card. It would be possible, for example, for toll fees GEB to be debited erroneously when, for example, a road which is subject to a toll fee and a road which can be used free of charge run closely alongside one another. The entry to and exit from the route STR which is subject to a toll fee, that is to say the activation of the prepayment card, can be entered by the driver of the vehicle FAR by operating an input device which is provided for this purpose, for example a key on the prepayment card. The vehicle driver may in this way be obliged to take the appropriate action, in a similar way to that when canceling a tram ticket. Furthermore, this allows the accuracy requirements for position finding to be restricted to the accuracy that can be achieved by means of a GPS toll system, without any need to transmit correction data.

The prepayment card may advantageously be in the form of a smart card which can be inserted into a car radio, in which case the prepayment card can be controlled, that is to say activated and deactivated, via the car radio.

Figure 8:
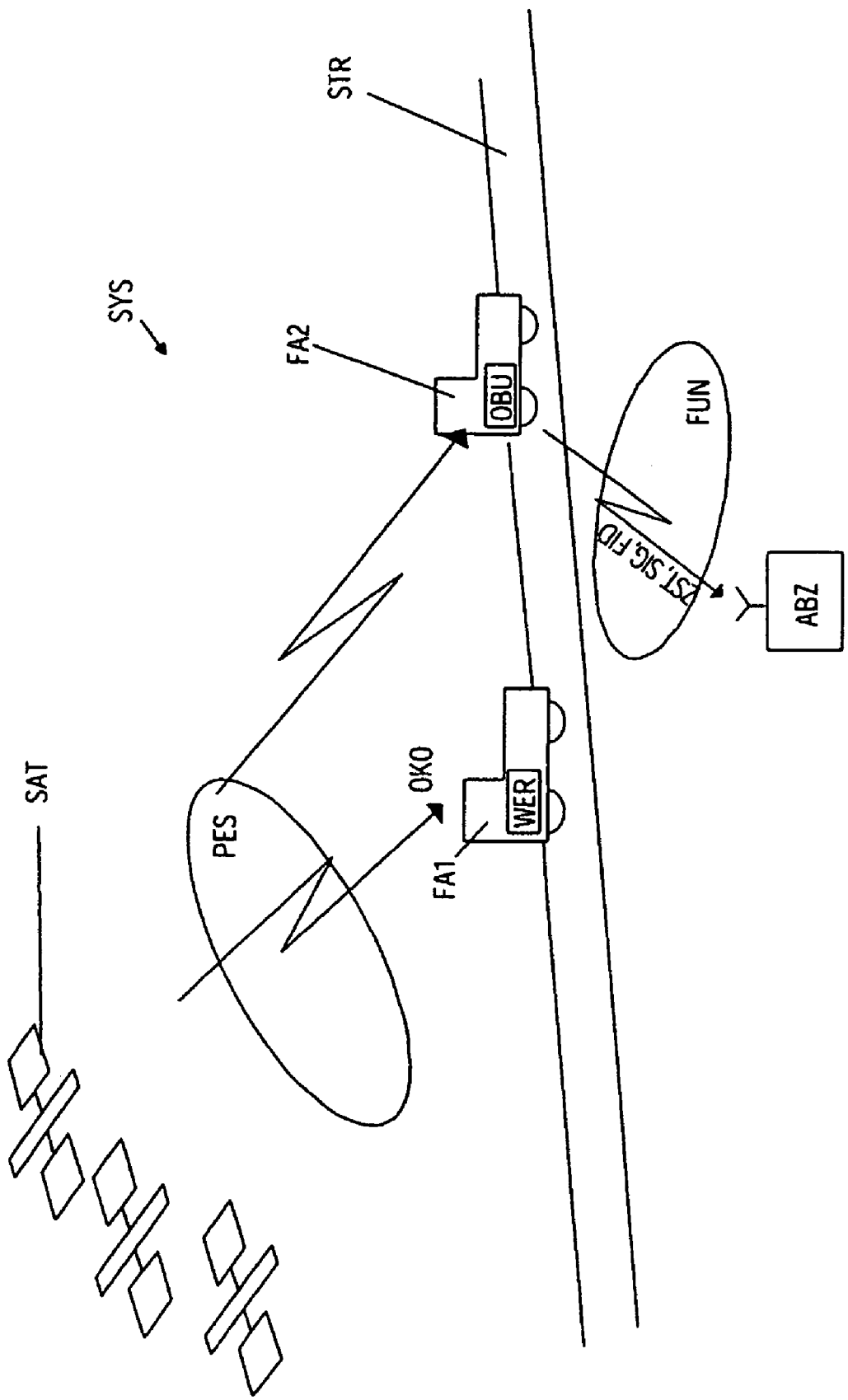
FIG. 8 shows a dual toll system with a billing center which is designed to communicate with a toll payment apparatus according to an embodiment of the invention.

A second type of toll payment, which can be implemented by way of the dual toll system, provides for the usage authorization BER to be stored in the billing center ABZ, as is shown in FIG. 8. This is preferably an account KON that is associated with the vehicle FAR. With this type of toll payment, in contrast to the prepayment card, a communication takes place between the vehicle FAR and the toll payment apparatus BE2 according to an embodiment of the invention in order to determine the current position coordinates of the vehicle FAR, and a billing center ABZ. The toll payment apparatus BE2 according to an embodiment of the invention and having a communication capability is referred to in the following text as a calculation unit OBU.

Figure 9:
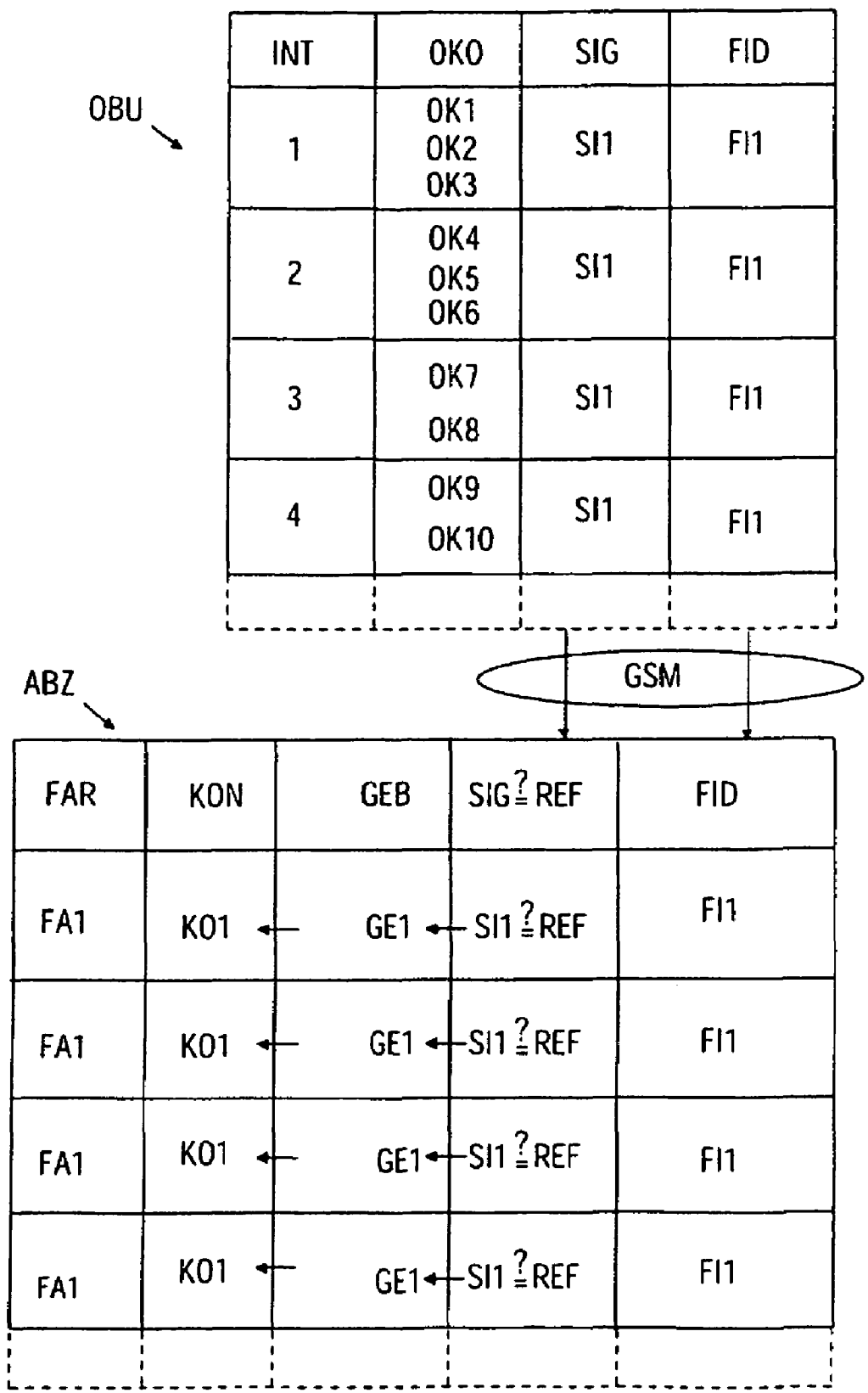
FIG. 9 shows the billing center and the toll payment apparatus according to an embodiment of the invention from FIG. 8, in more detail.

As is shown in FIG. 9, the signature SIG, SI1 can be calculated at intervals which can be predetermined in the calculation unit OBU according to an embodiment of the invention and can be transmitted via a radio network FUN, for example a GSM or UMTS network, etc. to the billing center ABZ. As already mentioned above, the determination of the toll fee GEB, GE1 to be paid can be carried out in the billing center ABZ by comparison of the signature SIG for the route traveled with the reference signatures REF of routes which are subject to a toll fee. The debiting from an account KON, KO1 which is associated with the vehicle FAR or with the calculation unit OBU can thus be carried out immediately "on line", if the route that the vehicle FAR is traveling on is subject to a toll fee, on the basis of the signature SIG, S11 and a vehicle or calculation unit identification FID, FI1 that is carried in the vehicle.

A further possibility is for the determined toll fees GEB to be collected over a time period which can be predetermined, for example for a month, and for the toll fee that has been incurred to be debited from the account KON, KO1 in the billing center ABZ at a later time. The usage authorization BER which is stored in the billing center ABZ may, of course, be implemented in an analogous manner to the prepayment card, in the form of a time card ZEI, etc.

The signature SIG can also be calculated in the billing center ABZ, for which purpose the position coordinates OKO are transmitted to the billing center ABZ. Since, as already mentioned above, the signature SIG can be calculated at intervals which can be predetermined, there is no need in this case either to transmit position data to the billing center permanently. This makes it possible to considerably reduce the amount of data, by calculation of the signature SIG in the toll system according to an embodiment of the invention.

If the toll fees GEB are debited on line from the account KON, and no involvement by the driver is envisaged in the form of activation of the calculation unit OBU on entry to a traffic area that is subject to a toll fee, as in the case of the prepayment card, then it may be necessary, if the position finding system PES that is used is the GPS toll system, to transmit position correction data in order to preclude incorrect billing or toll fees. This is because, as already mentioned above, it is possible for incorrect billing of toll fees to occur in the case of roads which run parallel to one another. The position correction data may be determined using a dGPS method and may be transmitted via a radio network, for example the GSM network etc., to the calculation unit OBU. A method such as this for transmission of correction data has been disclosed, for example, in WO 94/12892. With regard to the expression dGPS, see also the Dissertation to the Faculty of Electrical Engineering and Information Technology at the Munich Technical University cited above and "Geolocator ein GPS-basiertes Fahrzeugortungssystem [Geolocator, a GPS-based vehicle position-finding system]; Bernhard Liedl; Diploma Thesis at the Institute for Information Processing and Microprocessor Technology at the Johannes Kepler University, Linz", the entire contents of which are hereby incorporated herein by reference.

For evidential purposes, driving profile positions and the signature SIG for the route STR as well as any information relating to the usage time, for example in the form of a time stamp ZST which is attached to the currently determined signature SIG, can be stored in a memory in the prepayment card or the billing center ABZ, and can be made available if required. The attachment of a time stamp ZST to the signature SIG also offers the advantage that, when the user authorization is in the form of a time card ZEI, it is very easily possible to check whether the time card is still valid. The signature SIG and the time stamp ZST are now an unambiguous cross-reference to be produced related to use of a route which is subject to a toll fee.

Figure 10:
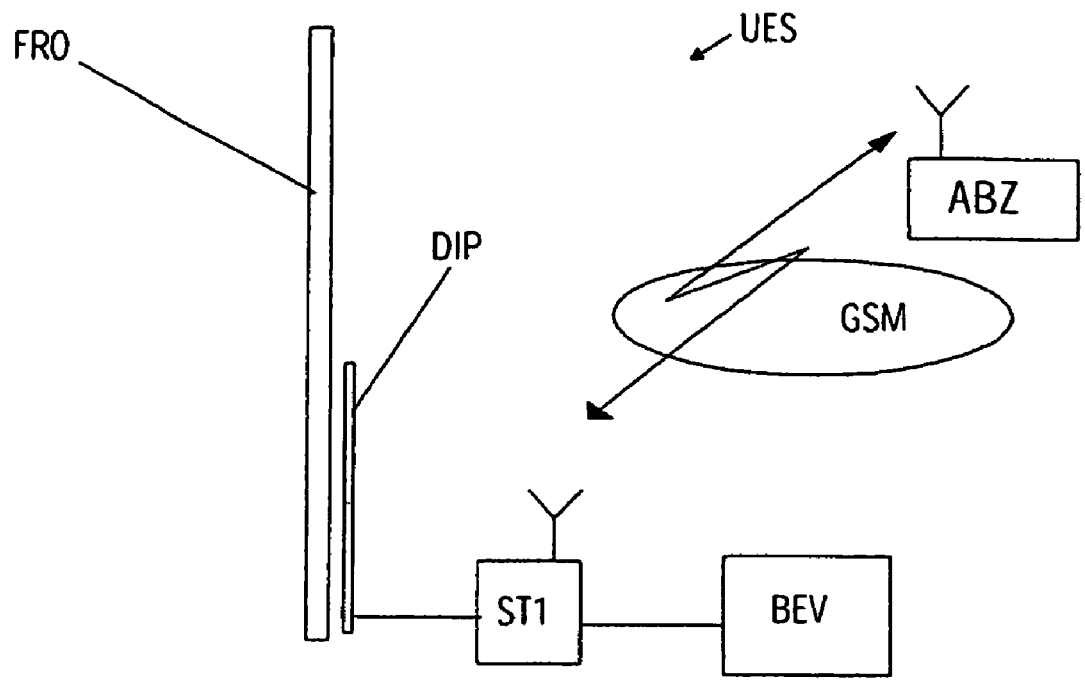
FIG. 10 shows a monitoring system for monitoring the operating state of the toll payment apparatuses in the dual toll system shown in FIG. 8.
Figure 11:
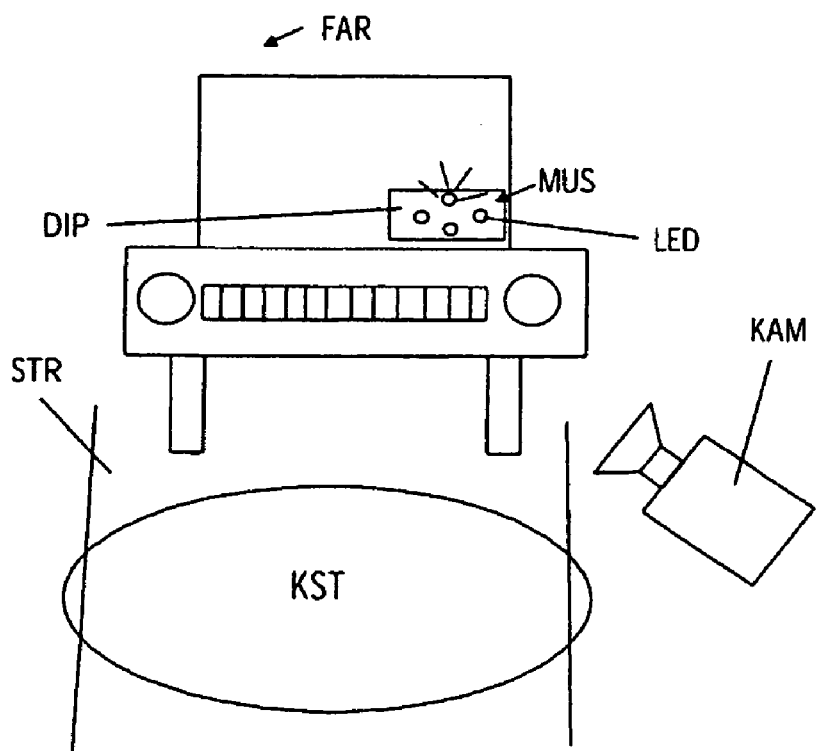
FIG. 11 shows a display which is arranged on a vehicle, in order to indicate a monitoring pattern which is representative of the operating state of the toll payment apparatus.

As is illustrated in FIG. 10, a monitoring system UES may be provided for monitoring correct operation of the toll system or the repayment card and of the calculation unit OBU. The monitoring system may have a controller ST1 as well as a display DIP which is connected to it and is designed to display an optical pattern MUS which can be predetermined (FIG. 11). The optical pattern MUS may depend on the current operating state of the toll payment apparatus BEV which is located on board the vehicle FAR, that is to say the operating state of the prepayment card or of the calculation unit OBU. The controller ST1 for the monitoring system UES can monitor whether a valid usage authorization BER is available in the prepayment card or in the billing center, or whether the toll payment apparatus BEV which is located on board the vehicle is switched on.

In order to display the pattern MUS as a function of the operating state of the prepayment card, the controller ST1 can check the state of the usage authorization BER in the prepayment card, and whether the prepayment card is switched on or off.

If the toll payment apparatus BEV which is located on board the vehicle is the calculation unit OBU, then the controller ST1 for the monitoring system can exchange data with the billing center ABZ in order to determine whether a valid user authorization BER exists.

The controller ST1 controls the display DIP as a function of the current operating state of the toll payment apparatus BEV (prepayment card or calculation unit OBU) and the presence of the user authorization, on which the pattern MUS which corresponds to the current operating state is displayed. In order to display the pattern MUS, the display DIP may, for example, have light-emitting diodes LED, infrared light-emitting diodes or other optical signaling capabilities.

If there is no valid user authorization BER in the prepayment card or in the billing center, then an optical pattern MUS that is intended for this purpose is displayed, for example on the front FRO of the vehicle.

Impermissible manipulations of the prepayment card or of the calculation unit OBU by the driver can also be identified by the controller ST1.

For example, the controller ST1 for the monitoring system can be designed to display a pattern MUS that is intended for this purpose on the display, for example an illuminated light-emitting diode LED, when an incorrect code COD for user authorization BER has been entered in the prepayment card two or more times.

In order to prevent manipulation by the driver, the pattern MUS is/may be changed after a cycle which is stored in the electronic toll payment device BEV—the prepayment card or the calculation unit OBU. If the calculation unit OBU has a communication capability, the pattern may also be changed externally, for example via a GSM broadcast request.

The inputting of the entry to or exit from a route STR which is subject to a toll fee, that is to say the activation of the prepayment card, can be carried out by the driver of the vehicle FAR by operating an input apparatus which is provided for this purpose, for example a key on an input unit for the prepayment card.

This allows the vehicle driver to have the obligation to carry out an action, in a similar way to the cancellation of a tram ticket.

If the prepayment card has been switched on by the vehicle user and there is a valid usage authorization BER in its memory SPR, then the controller ST1 produces an optical pattern MUS corresponding to this on the display DIP, for example two illuminated light-emitting diodes LED while, if the prepayment card is in the switched-off state, a pattern MUS which characterizes this state is produced—for example with none of the light-emitting diodes LED emitting light in this situation.

The same applies, of course, to the calculation unit OBU, whose user authorization is stored in the billing center. If, for example, the account in the billing center ABZ for the vehicle FAR is overdrawn by an amount which can be predetermined or the account holder is overdue in repaying his toll fee, then the state of the account KON may be changed from "valid" to "invalid". In this case, the controller ST1 displays the pattern MUS which is intended for this situation on the display.

The displayed pattern MUS thus makes it possible to identify whether the driver of the vehicle FAR is a potential or actual toll infringer.

When driving through a fixed monitoring station KST, the displayed pattern MUS can now be evaluated and can be used as a trigger signal for a license plate OCR. In this context, OCR stands for "Optical Character Recognition" and includes known methods for optical pattern recognition. The advantage of this solution, in addition to the low costs, is that there is no need to pass every vehicle through a license plate OCR. (Infrared patterns can be identified by low-cost interference filters using an infrared camera KAM, with appropriately high light power from the LEDs, with a very much higher signal-to-noise ratio than license plates with purely passive license plate OCR. The identification of a few simple patterns can likewise be carried out with much better reliability.)

The monitoring system UES is not used for communication as in the case of WO 99/66455, for example, but is used to reduce the frequency of the more complex license plate OCR, which is considerably less reliable in the environmental conditions to be expected. When OCR is carried out centrally, this considerably reduces the amount of data between the fixed-position enforcement stations and the OCR control center.

Mobile monitoring can likewise be carried out using an infrared camera. In addition to this, a pre-selection process can be carried out in the visible band, as well as using additional LED sources. Alternatively, signaling can generally be carried out in the visible band.

Three types of vehicles FAR may arrive within the debiting region:

1. Vehicles FAR without or with an invalid (manipulated) IR/LED signature; these are either toll infringers as are possible in principle with any given automatic toll payment method; alternatively, these are toll payers with defective toll payment apparatuses BEV, or without or with invalid usage authorization BER, for example whose credit GUT has been consumed or whose account KON has been blocked. All of these users can be identified at appropriate monitoring stations (fixed or mobile), and can be dealt with in accordance with defined rules.

2. Vehicles with a valid IR/LED signature, with the fact that a state region has been left being identified and, for example, the communication between the toll payment apparatus BER and the billing center ABZ together with the toll payment process being deactivated and position finding now being carried out, or with a change being made to the toll system, whose basic technology is compatible, in an adjacent country or state.

3. Since the current position of the vehicle is known in the calculation unit BEE in the vehicle and it is possible for this calculation unit BEE to identify which coordinate point is located on this side of or beyond the boundary, it is possible to activate the correct pattern in good time even before crossing over a boundary on a route which is subject to a toll fee. A tolerance zone is advantageously provided around the boundary, in which it is not absolutely essential to activate the calculation unit. If the journey continues in the national region on a traffic area that is subject to a toll fee, then the toll payment is made in accordance with the method according to an embodiment of the invention.

As already mentioned above, the signatures SIG for the routes STR traveled may represent a further monitoring element. For this purpose, these are not subjected to real time comparison but, for evidential purposes, can be stored, for example, in the toll payment apparatus BEV or in the billing center ABZ. The stored data may in this case be retained on the basis of a ring memory principle for a time period which can be predetermined, for example two months.

Signatures SIG may also be calculated continuously and be stored together with a time stamp STE and the status of the toll payment apparatus BEV or of the user authorization. This data may either be removed when the next debiting process is carried out with a repayment card, or may be transmitted permanently or at intervals which can be predetermined to the toll payment control center if the calculation unit OBU has a communication capability, and may be processed by this toll payment control center using suitable methods (for example known movement profiles being compared with impossible statistical movement profiles, etc). in order to obtain blacklists or other interesting features for operation of the entire toll system.

A further object of an embodiment of the invention is to provide the capability to make it possible to dispense with an online communication system, for example the GSM network, with a vehicle-external toll control point. This makes it possible to achieve a highly cost-effective implementation of the method or toll system according to an embodiment of the invention, despite retention of the virtual toll payment. A further advantage of the invention is that the equivalent as required by the lawmakers of online (via the calculation unit OBU and the billing center ABZ) and offline (via the prepayment WEK) paying vehicle operators can be achieved within the same infrastructure, so that a "dual" toll system can thus be implemented in a simple manner.

Exemplary embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A vehicle toll payment apparatus for a toll system, comprising:
   a receiving unit designed to receive position data from a position finding system and to transmit the position data to a controller, the controller being designed to use the position data to determine current position coordinates for the vehicle; and
   a transmitting unit designed to transmit data to a billing center, wherein the controller is designed to use the position coordinates to calculate a signature characteristic of a route traveled, and to send this to the transmitting unit, the billing center configured to use the signature for determining whether the route is subject to a toll fee by comparing the signature to reference signatures for routes that are subject to toll fees without determining positions of the position coordinates on a map.

2. A vehicle toll payment apparatus for a toll system, comprising:
   a receiving unit designed to receive position data from a position finding system and to transmit the position data to a controller, the controller being designed to use the position data to determine current position coordinates for the vehicle; and
   a transmitting unit designed to transmit data to a billing center, wherein the controller is designed to use the position coordinates to calculate a signature characteristic of a route traveled, and to send this to the transmitting unit, the billing center configured to use the signature for comparison to reference signatures for routes that are subject to toll fees by determining a reference signature in which start and end points of the signature coincide with points in the reference signature and calculating a size of an area which is bounded by the signature and the reference signature.

3. The vehicle toll payment apparatus of claim 1, wherein comparing the signature to reference signatures is based on at least one of a spectral analysis and time-domain analysis.

* * * * *